May 26, 1964 N. W. MYERS 3,134,794
METHOD FOR CONTINUOUS DEGUMMING OF VEGETABLE OIL
Filed March 7, 1955 3 Sheets-Sheet 1
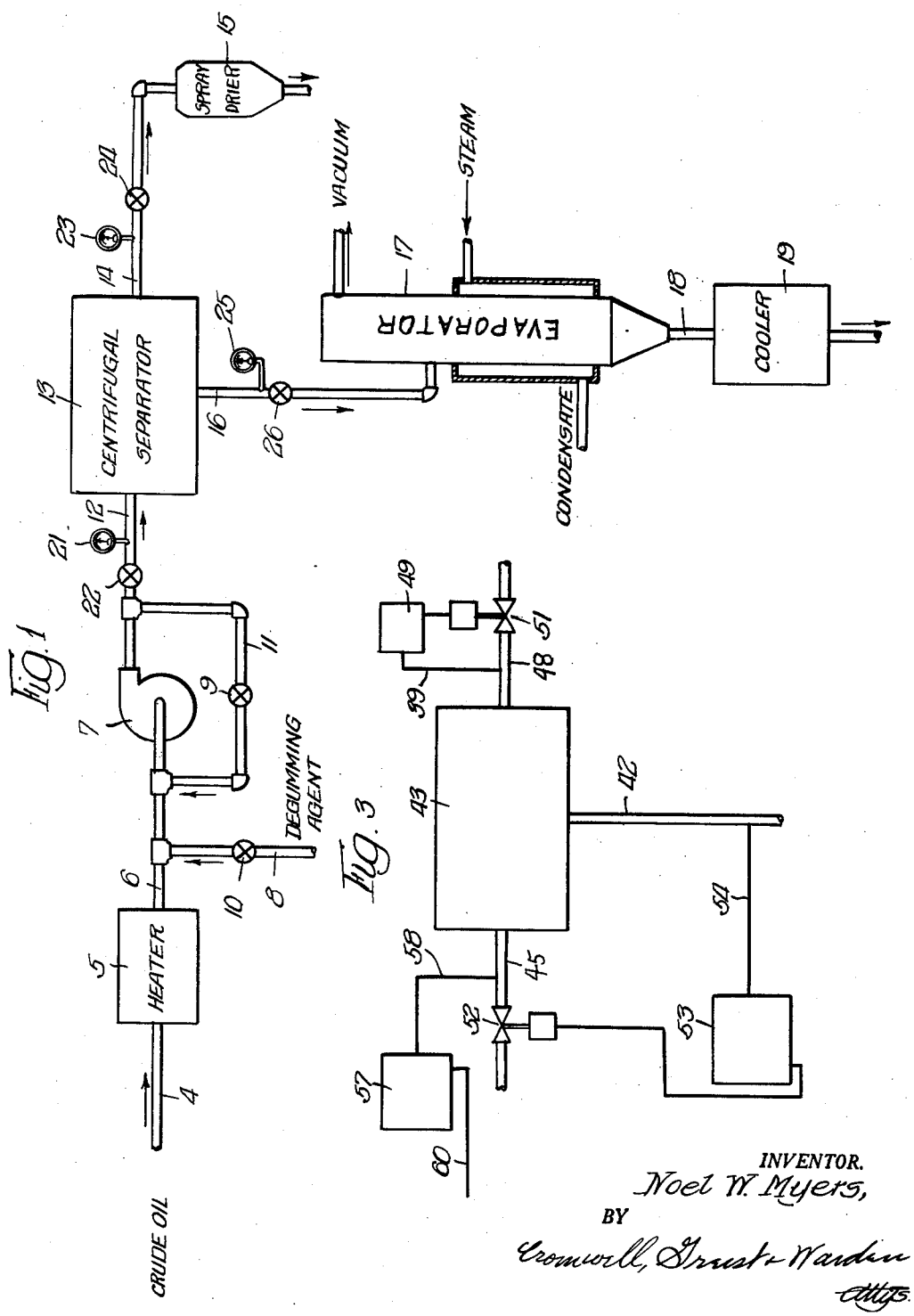
INVENTOR.
Noel W. Myers,
BY
Cromwell, Trust + Warden
Attys.

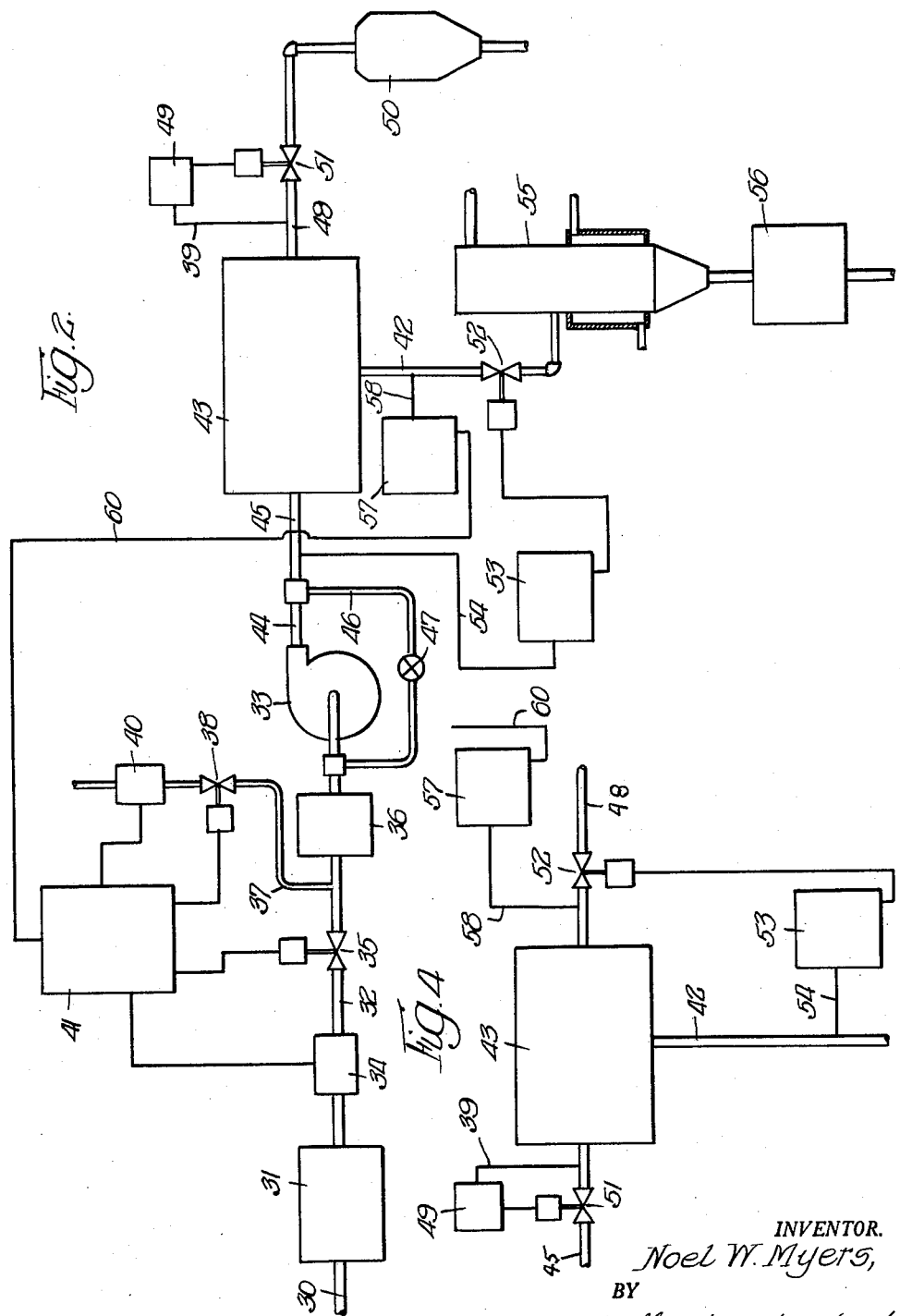

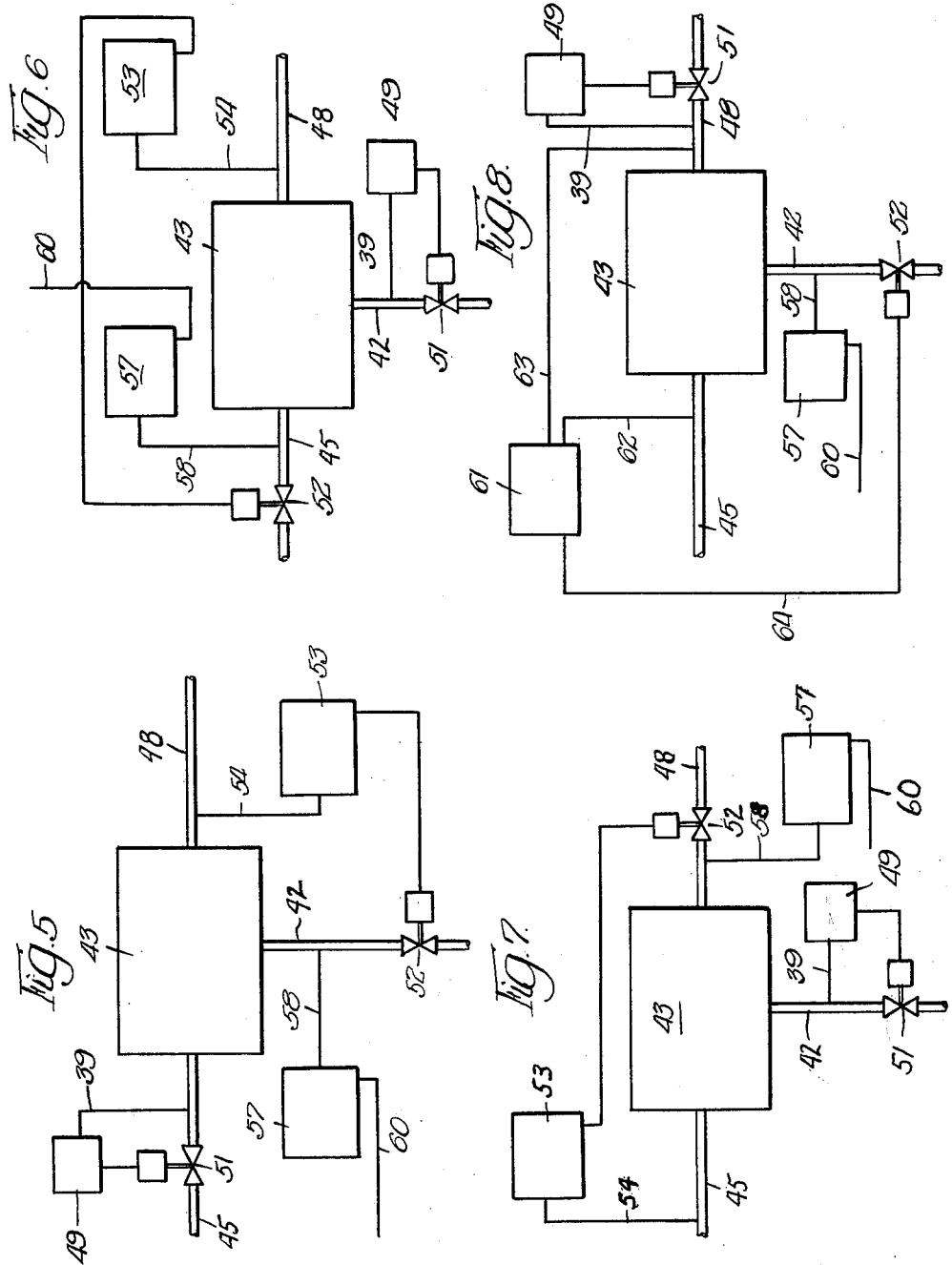

United States Patent Office 3,134,794
Patented May 26, 1964

3,134,794
METHOD FOR CONTINUOUS DEGUMMING OF VEGETABLE OIL
Noel W. Myers, Decatur, Ill., assignor to A. E. Staley Manufacturing Company, Decatur, Ill., a corporation of Delaware
Filed Mar. 7, 1955, Ser. No. 492,715
5 Claims. (Cl. 260—424)

This invention relates generally to a new and improved process for continuously degumming lecithin-bearing vegetable oils. The invention also relates to a continuous degumming process wherein dried lecithin is continuously produced. In addition, the invention relates to means and apparatus for carrying out such continuous degumming and lecithin-producing processes.

While the present invention is particularly useful in connection with the degumming of soybean oil and the recovery of dried soybean lecithin in a continuous process, it has application to lecithin-bearing vegetable oils, generally, such as cottonseed oil, corn oil, peanut oil, linseed oil, tung oil and perilla oil.

Crude vegetable oils of the class referred to above as lecithin-bearing vegetable oils, contain substances which upon contact with water will settle out or precipitate from the main body of the oil. Such substances are commonly referred to in the art as "gum" or "gums" and they are obtained in the commercial refining of vegetable oils, such as crude soybean oil, by the addition of water alone, or an aqueous degumming agent, to the crude oil followed by some type of phase separating treatment, e.g., centrifuging. The separated gums, after drying, are marketed commercially as "lecithin."

Vegetable oils are degummed not only to recover the commercially valuable lecithin content therefrom, but also to remove the gums from the oil, their presence being undesirable for most of the uses made of the oils. Water alone is a fairly satisfactory degumming agent and when a small amount (e.g., 1–3%) of water is intimately mixed with vegetable oil at elevated temperature (e.g., 120–180° F.), it will precipitate the gums to a large extent. However, water alone normally does not result in complete separation and removal of lecithin or other gum-forming substances, and therefore it is customary to employ additional degumming agents. It has been found that acid anhydrides selected from the group consisting of lower alkyl aliphatic monobasic and dibasic acid anhydrides, and in particular acetic anhydride, constitute excellent degumming agents for addition to degumming water. When properly employed, acetic anhydride will so completely and thoroughly degum a vegetable oil that after separation and washing of the gums they will be acid break-free or Gardner break-free oil according to American Oil Chemists Society, Official Method Ca 10–40, May 1949. The use of acid anhydrides, and particularly acetic anhydride, in degumming vegetable oils is disclosed in copending application of Hayes and Wolff, Serial No. 333,-374, filed January 26, 1953, issued February 19, 1957, as Patent No. 2,782,216. The continuous process of the present invention is particularly suited for the use of acetic anhydride as the degumming agent since the process can be carried out automatically and uniformly with a high degree of precision.

According to the present invention, a continuous type process has been provided whereby vegetable oils, and particularly soybean oil, may be efficiently degummed, and in a preferred embodiment the precipitated gums may be continuously dried. High quality degummed oil and lecithin may be economically produced in this process, and the process may be automatically controlled so as to operate with a high degree of uniformity and produce degummed oil and dry lecithin having very uniform properties.

In its preferred form, the present invention involves the new use in combination of two known types of processing equipment, one being a centrifugal separator arranged to be fed under pressure and to continuously separate and discharge two liquids of different specific gravity (i.e., degummed oil and wet gums) and the other being a continuous type thin film evaporator operated under vacuum. The oil to be degummed is intimately mixed with the required amount of degumming agent (e.g., water, with or without additional degumming agent) at an elevated temperature for a sufficient time to precipitate the gums. This mixture is introduced under pressure into a centrifugal separator of the type mentioned. The precipitated gums, usually referred to in the art as "wet gums," which are discharged as the heavier liquid from this type of separator, are introduced directly (i.e., without any appreciable retention time) into a continuous film evaporator or drier.

As used in practicing this invention, the centrifugal separator will have the three following connections, the feed or oil-in connection; the oil-out connection; and the gum-out connection. A unique feature of the invention is the ability, by means of known types of automatic control mechanisms, to maintain the pressures in these three connections uniform and the operation of the separator uniform, while automatically regulating the addition of degumming agent in response to the requirements of the crude oil, such requirement for degumming reagent being the main variable in the process.

One object of the invention is an efficient continuous process for degumming vegetable oils, particularly soybean oil, in which the precipitated and separated gums are immediately dried in a continuous film evaporator without being held for any appreciable retention time.

Another object of the invention is a process and apparatus for continuously degumming vegetable oils, particularly soybean oil, wherein an intimate mixture of the oil and precipitated gums is fed under pressure into a centrifugal separator in which the gums and oil are separated and continuously discharged in separate streams, and the stream of wet gums is introduced without retention into a continuous film evaporator or drier operating under a vacuum.

Another object of the invention is a continuous and automatically controlled method and apparatus for mixing degumming agent and a vegetable oil and separating the resulting mixture of oil and precipitated gums into a stream of degummed oil and a stream of wet gums, such method and apparatus including a manner of and means for automatic control wherein the addition of degumming agent is automatically regulated according to the requirements of the crude oil.

Another object of the invention is a process and apparatus for continuously degumming a vegetable oil and separating an intimate mixture of vegetable oil and precipitated gums into a stream of degummed oil and a stream of wet gums, wherein such a mixture is fed into the inlet connection of a centrifugal separator which continuously separates the mixture and discharges a stream of degummed oil through the oil-out connection and a stream of wet gums through the gum-out connection, independently and automatically maintaining a uniform pressure in one of the three connections, maintaining a uniform pressure in one of the two remaining connections by automatically throttling the flow of liquid through the third connection, and maintaining a uniform pressure in the third connection by automatically controlling the addition of degumming agent.

Another object of the invention is a process and apparatus for continuously degumming a vegetable oil and separating an intimate mixture of vegetable oil and precipitated gums into a stream of degummed oil and a stream of precipitated or wet gums, wherein such a mixture is fed under pressure into a continuous type centrifugal separator, the discharge pressure in the degummed oil-out line is automatically maintained at a uniform predetermined value by means of a suitable regulator, and the feed pressure into the separator is maintained at a uniform predetermined value by automatically throttling the flow of wet gums discharged from the separator by means of an automatic regulator having a sensing element responsive to the feed pressure, and maintaining the gum-out pressure from the separator uniform by automatically regulating the quantity of degumming agent introduced into the oil by means of an automatic regulator which has a sensing element responsive to variations in gum-out pressure at which the wet gums are discharged from the separator.

Another object of the invention is a continuous process of degumming vegetable oils of the type referred to in the foregoing objects in which an aqueous solution of acetic anhydride is utilized as the degumming agent, and the degummed oil produced is acid break-free after washing.

Certain other objects of the invention will, in part, be obvious and will, in part, appear hereinafter.

For a more complete understanding of the nature and scope of the invention, reference may now be had to the following detailed description thereof taken in connection with the accompanying drawings, wherein:

FIG. 1 is a flow diagram illustrating and showing a continuously operating process and apparatus whereby the invention may be practiced;

FIG. 2 is a flow diagram of an apparatus and process similar to FIG. 1 wherein one form of full automatic control equipment is incorporated; and FIGS. 3 to 8 are diagrams of five alternate forms of full automatic control which may be used in place of the form illustrated in FIG. 2.

Referring to FIG. 1, crude vegetable oil to be degummed is continuously introduced from a supply line 4 into a heat exchanger 5 of known type which raises the temperature of the oil to a suitable degumming temperature, e.g., 120°–180° F. for soybean oil. The heated oil is continuously passed from the heat exchanger 5 through a line 6 into a high head centrifugal pump indicated at 7. A degumming agent, e.g., water, is introduced into the line 6 through a line 8 provided with a regulating valve 10 of known type.

Preferably, the pump 7 has a capacity substantially in excess of the rate of flow of the crude oil being degummed and a substantial portion of the stream discharged from the pump is by-passed and returned to the suction inlet thereof through a by-pass line 11 provided with a throttle valve 9. For example, two-thirds of the volume of liquid discharged from the pump 7 may be recirculated through the by-pass 11 while one-third is discharged under pressure through a feed connection 12 into a centrifugal separator of known type designated 13. The separator 13 operates in a continuous manner to separate the mixture of oil and gums because of their different specific gravities and to discharge a stream of degummed oil through an oil-out connection 14 and a stream of wet gums through a gum-out connection 16.

Generally speaking, these centrifugal separators are operated at pressures in the range of 100 p.s.i.g. in order to force the separated gum phase rapidly out of the separator. The pressure in the oil-out stream is generally set at some value in the 100 p.s.i.g. range. The feed pressure of the oil stream to the separator will not only be a function of the oil-out pressure but also a function of the thickness of the layer of the higher specific gravity gum inside the spinning bowl or rotor of the machine. The thickness of the layer of gum inside the bowl or rotor determines the quality of the degummed oil stream as well as the quality of the gum stream. The thickness of the gum layer can be controlled by holding the oil feed stream pressure at any predetermined value by adjusting the rate of discharge of the gum from the machine. Other variations and methods of controlling the quality of degummed oil and discharged gum will be discussed at length later. Three well known centrifugal separators of this general type which are commercially available in this country are the so-called Podbielniak, DeLaval and Westphalia separators or centrifuges.

The degummed oil is discharged into a continuous spray drier 15 of known type from the bottom of which the dry degummed oil is passed to storage. The separated wet gums are discharged from the connection 16 directly into a continuous film type evaporator indicated at 17 operating under reduced pressure of vacuum. An evaporator or drier of this type is disclosed, for example, in U.S. Patents Nos. 2,542,269 and 2,542,270 to Zahm, and 2,596,086 to Muller. This type of drier is commercially available under the name "Turba-Film Evaporator" from Rodney Hunt Machine Company, Orange, Massachusetts. In the drier or evaporator 17 the molten wet gums flow downwardly by gravity across the heated interior surface of a vertical tube. A rotary agitator (not shown) serves to force the wet gums out into a thin film against the tube wall and keep the wet gums in rapid movement over the heated surface so as to secure rapid heat transfer and prevent localized overheating and burning. A reduced pressure or vacuum of suitable magnitude (e.g. 5–200 millimeters of mercury absolute) is maintained on the interior of the drier so as to hasten the removal of moisture at a reduced temperature. By the time the hot gums reach the bottom of the drier, they are dry and ready to be discharged through the connection 18 into a cooler 19 wherein they are cooled to a suitable temperature (e.g. 140° F.) before being stored or packaged.

An oil treating plant of the type described in FIG. 1 has been successfully operated in the following manner for refining crude soybean oil. Crude soybean oil was heated in the heat exchanged 5 to a suitable degumming temperature of 120°–180° F. Degumming water was introduced into the stream of heated oil flowing in line 6 in an amount equal to from 1%–3% by volume of the oil depending upon the gum content of the oil. When desired, one or several known degumming additives may be introduced into the oil either with the degumming water or separately.

The pump 7 not only serves to discharge the oil and precipitated gum mixture under pressure into the separator 13 but it also serves to produce an intimate agitation and contact between the degumming agent and the oil. The valve 9 in the by-pass line 11 may be set so that the flow through the by-pass is from 2–3 times the discharge flow into the separator. The degree and time of contact between the oil and the degumming agent can be controlled by regulating the valve 9 so as to increase or decrease the amount of recirculation.

The continuous film drier or evaporator 17 may be suitably operated at a maximum evaporating surface temperature of 275° F. while the interior is maintained under a reduced pressure of approximately 5–200 millimeters of mercury absolute. The dry lecithin discharged through the line 18 will have a temperature of approximately 275° F. and is cooled to a temperature of about 140° F.

The apparatus described in FIG. 1 may be operated satisfactorily with manual controls, especially when the crude oil being degummed has a fairly uniform character such as may be obtained from a single thoroughly blended supply. However, it is inconvenient or difficult to uniformly control the apparatus and process if there is appreciable variation in the character and gum content of the oil being treated. Often there is such variation in the character and gum content of a crude vegetable oil such as soybean oil. Since a laboratory analysis of crude oil for gum content requires from one to two hours, and this is usually too late, difficulty is sometimes encountered in establishing and maintaining a smooth, uniform operation with the apparatus described in FIG. 1 when there is appreciable variation in the crude oil being supplied to the system. Furthermore, when acetic anhydride is used as a degumming reagent, the addition of degumming agent becomes much more critical since the correct amount must be used in order to obtain maximum degumming and a break-free oil.

The controls which may be used to manually control the separator 13 include: a pressure gauge 21 and throttle valve 22 in the feed or inlet connection 12; a pressure gauge 23 and throttle valve 24 in the oil-out connection 14; and a pressure gauge 25 and throttle valve 26 in the gum-out connection 16.

It has been found that the apparatus and process described in FIG. 1 may be automatically controlled in a very satisfactory manner by means of unique use of automatic control mechanism of known type so as to automatically compensate for the main variable in the process, i.e., variation in the gum content and degumming properties of the crude oil introduced into the process. Such an automatic control system for the type of process and apparatus represented in FIG. 1 is diagrammatically shown in FIG. 2 of the drawings.

Referring to FIG. 2, crude or raw oil is introduced to the system through line 30 into a heater 31 of known type and then discharged through a line 32 to the suction side of a centrifugal pump 33. A flow measuring device indicated diagrammatically at 34 is disposed in the line 32. For example, this device may be a flow rate transmitter of the type commercially available from Fischer & Porter Company, of Hatboro, Pennsylvania. A power operated throttle valve 35 is disposed in line 32 downstream from the flow transmitter 34. The throttle valve 35 may be of known type and operated by compressed air, by an electric motor or otherwise. In the line 32 and downstream from the valve 35, a retention tank 36 is located. The purpose of the retention tank 36 is to retain the mixture of crude oil and a degumming agent introduced through line 37 for a time sufficient to permit the degumming agent to act on the oil. As pointed out above, the degumming agent may be water with or without a degumming additive of known type. A power operated throttle valve 38 is disposed in the line 37, and upstream of this valve a flow transmitter 40 is disposed in the line 37.

The flow transmitters 34 and 40 and the throttle valves 35 and 38 are suitably connected in a manner well known in the instrumentation art to an automatic controller of known type, designated at 41. For example, the controller 41 may be a so-called pneumatic set ratio controller of the types referred to on page 5 of Fischer & Porter Company's Catalog 53–10 dated May 1954. The controller 41 serves to control the flow of oil in line 32 at a predetermined value by means of the automatic valve 35 operating in response to the flow transmitter 34. The controller 41 also serves to control the ratio of degumming agent to oil flow at any predetermined ratio depending upon the setting made. The setting of the ratio of degumming agent to oil flow is automatically regulated in response to changes in pressure in the gum-out line 42 from a centrifugal separator 43 in a manner described below.

The pump 33 discharges through a line 44 into the feed connection 45 of a centrifugal separator 43. Preferably, a by-pass line 46 is provided whereby any desired portion of the discharge from the pump 33 may be recirculated. The by-pass line 46 is provided with a throttle valve 47 in order that the proportion of flow in the line 44 which is by-passed may be regulated. As explained above in connection with FIG. 1, the pump 33 not only serves to deliver the oil-degumming agent mixture under pressure to the centrifugal separator 43 but it also produces an intimate action and contact between the degumming agent and the oil.

The centrifugal separator 43 may be of the type described above in connection with FIG. 1 and has in addition to the feed connection 45 a gum-out connection 42 and an oil-out connection 48 leading to a spray drier 50.

The pressure in the oil-out connection 48 is maintained at a predetermined value by a power operated throttle valve 51 regulated by a pressure controller indicated at 49. The pressure in line 48 upstream of the valve 51 is transmitted to the controller 49 by a suitable connection 39. The pressure controller 49 may be of the type referred to on page 13 of Fischer & Porter Company's Catalog 11–A–10 dated September 1954. The pressure controller 49 operates to open or close the throttle valve 51 as required to maintain a uniform predetermined pressure in the oil-out connection 48.

In the particular arrangement shown in FIG. 2 the feed pressure in the connection 45 is maintained at a predetermined value by automatically throttling the flow of wet gums in the discharge or gum-out connection 42. For this purpose, a power operated throttle valve 52 is installed in the gum-out connection 42 and suitably connected to a pressure controller 53 which may correspond to pressure controller 49 or be of that type. The pressure controller 53 is also connected to the feed connection 45 by a pressure sensing and communicating connection 54. If the pressure in the feed connection 45 starts to rise above the predetermined set value, the controller 53 acts to operate the valve 52 so as to open it and increase the flow of wet gums. Conversely, if the pressure decreases in the inlet connection 45, then the valve 52 is automatically controlled to decrease the flow of wet gums in the gum-out connection 42. The wet gums from the connection 42 are discharged directly without going through enlargements or holding tanks into a thin film evaporator designated at 55 which may be of the type referred to above in connection with FIG. 1. The dry gums from the evaporator or drier 55 are discharged into a cooler 56 before going to storage as explained above in connection with FIG. 1.

In order to make the operation of the system shown in FIG. 2 completely automatic, an additional pressure controller 57 is provided having a pressure sensing element 58 connected to the gum-out line 42 upstream from the valve 52. The output of the controller 57 is connected through a connection 60 to the controller 41. The controller 57 may be like pressure controller 49 or an equivalent device.

In operation: Crude oil is introduced into the system and the rate of flow is maintained at a predetermined value by the controller 41 operating to control the throttle valve 35 in response to rate of flow measurement transmitted by the oil flow transmitter 34. Degumming agent is introduced into the crude oil stream through the line 37 under control of the automatic throttle valve 38. The rate of flow of degumming agent in the line 37 is transmitted to the controller 41 by means of the flow transmitter 40.

The degumming agent acts on the oil during the passage of the mixture through the retention tank 36 which may be omitted in certain instances depending upon the type of degumming agent used and the particular system. The pressure regulator or throttle valve 51 is operated so as to maintain the oil-out discharge pressure at any predetermined value in the oil-out connection 48. As mentioned above, the throttle valve 52 is operated automatically under influence of the feed pressure controller 53 so as to automatically maintain a predetermined uniform pressure in the feed or oil-in connection 45. Depending upon the nature and gum content of the crude oil being supplied through line 30 to the system, more or less degumming agent will be required to maintain a uniform pressure in the gum-out line 42 when predetermined pressures are maintained in the oil-out connection 48 and the feed connection 45, as described. Accordingly, in the particular ararngement shown in FIG. 2, variations in pressure in the gumout line 42 constitute a direct indication of variation in gum or lecithin content in the crude oil supplied to the system and afford a means of automatically controlling and regulating the amount of degumming agent added to the oil stream through the line 37.

A pressure increase in the gum-out connection 42 indicates that the wet gums are becoming increasingly fluid or liquid. More fluid gum reduces the friction of its passage through the discharge channels of the centrifugal separator 43 and connecting lines and hence the discharge pressure in line 42 becomes higher. This condition may be corrected by a decrease in the amount of degumming agent added. Conversely, if the pressure drops in the gum-out connection 42, this indicates that the wet gums are becoming stiff and viscous and an additional amount of degumming agent is required to correct this condition. The variations in pressure in the gum-out connection 42 are transmitted to the gum-out pressure controller 57 which relays a suitable signal or impulse to the pneumatic set ratio controller 41 where an automatic adjustment in the oil-degumming agent ratio by the controller serves to bring the pressure in the gum-out connection 42 back to normal by reducing or increasing this amount of degumming agent.

It will therefore be seen, as mentioned above, that the main variable in the process and system described in FIG. 2 is the variation in nature and gum content of the crude oil being refined, i.e. the degumming agent requirement of the oil. It will be seen also that the effect of such variation in the crude oil on the operation of the continuous system can be compensated for so that the system operates smoothly by automatically regulating the addition of degumming agent.

Since the separator 43 may be automatically controlled so as to operate smoothly with a uniform discharge of wet gums, it is entirely practical to introduce the wet gums directly into the thin film drier 55 wherein they are continuously dried.

While the particular automatic control system described above in connection with FIG. 2 for the centrifugal separator 43 is completely satisfactory, it is possible to revise the controls for the separator 43 while retaining the same type of automatic control thereof. Certain of such alternate or revised arrangements for controlling the separator 43 will be briefly summarized and described in connection with FIGS. 3–8.

In the instrumentation system shown in FIG. 2 for automatically controlling the separator 43, the pressures in the three connections to the separator 43 were controlled in the following manner: Oil-out pressure in connection 48 independently controlled; feed pressure in connection 45 controlled by throttling the flow of wet gums in the gum-out connection 42; and pressure in gum-out connection 42 controlled by regulating the addition of degumming agent to the crude oil.

In FIG. 3 a control arrangement for the separator 43 is shown wherein the pressures in the three connections of the separator 43 are controlled in the following manner: Oil-out pressure in connection 48 independently controlled; gum-out pressure in gum-out connection 42 controlled by throttling the flow of oil and precipitated gums through the feed connection 45; and pressure in the feed connection 45 controlled by regulating the flow of degumming agent added to the crude oil.

In FIG. 4 the system of control for the separator 43 is as follows: Feed-in pressure in the feed connection 45 independently controlled; gum-out pressure in gum-out connection 42 controlled by throttling the flow of degummed oil in the oil-out connection 48; and oil-out pressure in oil-out connection 48 controlled by regulating the flow of degumming agent.

Referring to FIG. 5, the system of control shown therein for the separator 43 is as follows: The feed pressure in the feed connection 45 is independently controlled; the oil-out pressure in connection 48 is automatically controlled by throttling the flow of wet gums; and the gum-out pressure is automatically controlled by regulating the rate of addition of the degumming agent.

Referring to FIG. 6, the system of control for the separator 43 illustrated therein is as follows: The gum-out pressure in the gum-out connection 42 is independently controlled; the oil-out pressure in the oil-out connection 48 is automatically controlled by throttling the flow through the feed connection 45; and the pressure in the feed line is automatically controlled by regulating the rate of addition of degumming agent.

In the control system for the separator 43 illustrated in FIG. 7, the automatic control arrangement is as follows: The gum-out pressure in the gum-out line 42 is independently controlled by automatically throttling the flow of wet gums through the gum-out connection; the feed pressure in the feed line 45 is automatically controlled by throttling the flow of degummed oil through the oil-out connection 48; and the pressure in the oil-out connection 48 is automatically controlled by regulating the rate of addition of degumming agent.

Referring to FIG. 8, there is diagrammatically shown therein a control system for the centrifugal separator 43 which constitutes another variation of the basic system shown in FIGS. 2–7. More specifically, the system illustrated in FIG. 8 may be treated as a variation of the system control shown in FIG. 2. In FIG. 8 a differential pressure controller is indicated diagrammatically at 61 which may be of the type referred to on page 4 of Fischer & Porter Company's Catalog 11–A–10 dated September 1954. This device is used in FIG. 8 in place of the pressure controller 53 used in FIG. 2. Pressure transmitting connections 62 and 63 connect the differential pressure controller 61 to the feed line 45 and oil-out line 48, respectively. The controller 61 is set so as to maintain a predetermined pressure differential between the pressures in lines 45 and 48. For example, if a pressure of 100 p.s.i.g. is maintained in the oil-out line 48, the controller 61 may be set to maintain a pressure differential of 30 p.s.i.g., which means a pressure of 130 p.s.i.g. in the feed line 45. The output signal or impulse from the controller 61 is conveyed to the throttle valve 52 through a connection 64 so as to regulate this valve in the gum-out line and thereby maintain the predetermined pressure differential. The pressure in the gum-out line 42 is maintained by the pressure controller 57 as described above in connection with FIG. 2.

It will be apparent that each of the pressure controllers 53 in FIGS. 3–7 may likewise be replaced by differential pressure controllers such as controller 61.

Other variations of the system for automatically controlling the centrifugal separator 43 may be devised, making use of commercially available control mechanisms.

When an acid anhydride is utilized as a degumming agent in the process of the invention, acetic anhydride being the one of choice, it will usually be added in an amount equal to 0.05–1% based on the weight of the crude oil. A preferred range is from 0.02–0.2%. When acetic anhydride is used, a satisfactory amount of degumming water will be about 1.5% based on the weight of the oil.

While it is usually desirable to operate the continuous thin film evaporator 17 or 55 in conjunction with the continued separators 13 and 43, respectively, as described above, it will be understood that, if desired, the wet gums may be dried by other known means and methods such as by batch methods.

Since these and certain further changes and modifications may be made in the embodiments of the invention described above in connection with the accompanying drawings, and since in the light of the disclosure additional embodiments of the invention may be provided without departing from the spirit and scope of the invention, all matter described above or shown in the

What is claimed as new is:

1. The method of continuously degumming vegetable oil which comprises, introducing a stream of aqueous degumming agent into a stream of vegetable oil, introducing the combined and mixed stream of oil and degumming agent under pressure into the inlet connection of a continuous centrifugal separator wherein the mixture is separated into degummed oil and wet gums and the degummed oil is discharged in a stream through an oil-out connection and the wet gums are discharged in a stream through a gum-out connection, automatically maintaining a predetermined pressure in one of said three connections by throttling the flow of liquid therethrough, automatically maintaining a predetermined pressure in one of the two remaining connections by throttling the flow of liquid through the remaining and third connection, and maintaining a uniform pressure in the third connection by automatically regulating the rate of addition of said degumming agent.

2. The method of continuously degumming vegetable oil which comprises, introducing a stream of aqueous degumming agent into a stream of vegetable oil, introducing the combined and mixed stream of oil and degumming agent under pressure into the inlet connection of a continuous centrifugal separator wherein the mixture is separated into degummed oil and wet gums and the degummed oil is discharged in a stream through an oil-out connection and the wet gums are discharged in a stream through a gum-out connection, maintaining a predetermined pressure in said oil-out connection by automatically throttling the flow of degummed oil therethrough, maintaining a predetermined pressure in said inlet connection by automatically throttling the flow of wet gums through said gum-out connection, and maintaining a uniform pressure in the gum-out connection by automatically regulating the rate of addition of said degumming agent.

3. The method called for in claim 1 wherein the vegetable oil is soybean oil.

4. The method called for in claim 2 wherein the vegetable oil is soybean oil.

5. The method of continuously degumming vegetable oil which comprises, introducing a stream of aqueous degumming agent into a stream of vegetable oil, introducing the combined and mixed stream of oil and degumming agent under pressure into the inlet connection of a continuous centrifugal separator wherein the mixture is separated into degummed oil and wet gums and the degummed oil is discharged in a stream through an oil-out connection and the wet gums are discharged in a stream through a gum-out connection, maintaining a predetermined pressure in said oil-out connection by automatically throttling the flow of degummed oil therethrough, maintaining a predetermined pressure in said inlet connection by automatically throttling the flow of wet gums through said gum-out connection, maintaining a uniform pressure in the gum-out connection by automatically regulating the rate of addition of said degumming agent, introducing the stream of wet gums without retention directly into an internal vacuum drier wherein said gums are passed in film form over a heated surface within a closed chamber maintained under reduced pressure, and removing the dry gums from said drier.

References Cited in the file of this patent

UNITED STATES PATENTS

| | | |
|---|---|---|
| 1,774,366 | Gluud et al. | Aug. 26, 1930 |
| 2,090,537 | Lund | Aug. 17, 1937 |
| 2,131,905 | Strezynski et al. | Oct. 4, 1938 |
| 2,150,732 | Thurman | Mar. 14, 1939 |
| 2,206,210 | Thurman | July 2, 1940 |
| 2,230,196 | Clayton | Jan. 28, 1941 |
| 2,525,702 | Mattikow | Oct. 10, 1950 |
| 2,567,404 | Ross | Sept. 11, 1951 |

OTHER REFERENCES

Perry Chemical Engineer's Handbook (Third Edition), 1950, pages 863–868, McGraw-Hill Book Co., Inc., New York, N.Y.